United States Patent [19]

Pedersen et al.

[11] Patent Number: 4,806,102
[45] Date of Patent: Feb. 21, 1989

[54] MODULAR LAYOUT ASSEMBLY

[75] Inventors: Chris S. Pedersen; Sue M. Merkel, both of Bismarck, N. Dak.

[73] Assignee: EZ Designer, Inc., Bismarck, N. Dak.

[21] Appl. No.: 572,757

[22] Filed: Jan. 23, 1984

[51] Int. Cl.[4] .............................................. G09B 25/00
[52] U.S. Cl. ........................................ 434/80; 434/73
[58] Field of Search .......................... 40/621; 273/239; 355/79; 434/72, 73, 74, 75, 79, 80, 94, 155, 430

[56] References Cited

U.S. PATENT DOCUMENTS

| | | | |
|---|---|---|---|
| 2,405,808 | 8/1946 | Armbright | 434/80 |
| 2,941,314 | 6/1960 | Schwieger | 434/73 |
| 3,228,133 | 1/1966 | Baermann | 434/430 X |
| 3,353,281 | 11/1967 | Schulze | 434/155 |
| 3,659,353 | 5/1972 | D'Agrosa | 434/73 |
| 3,896,565 | 7/1975 | Quinn | 434/155 |
| 3,994,079 | 11/1976 | Mirman | 434/73 |

FOREIGN PATENT DOCUMENTS

| | | | |
|---|---|---|---|
| 220398 | 3/1962 | Austria | 434/72 |
| 2608696 | 9/1977 | Fed. Rep. of Germany | 434/80 |
| 1184651 | 2/1959 | France | 434/80 |

Primary Examiner—William H. Grieb
Attorney, Agent, or Firm—Neuman, Williams, Anderson & Olson

[57] ABSTRACT

A modular layout assembly is disclosed for facilitating the layout of elements within a space. The modular layout assembly comprises a plurality of modules, each configured and dimensionally scaled to represent an element and made of a magnetically attracting material. A layout board for receiving the modules is made of a ferrous metal and presents a substantially planar surface; the planar surface has a grid thereon for assisting the arrangement of selected of the modules on the layout board. A case is provided for carrying the layout board and modules, and comprises first and second sections hinged together to permit the case to be opened and closed. The first section has a pocket for receiving the layout board, and a mechanism for retaining the layout board within the case to facilitate the arrangement of selected of the plurality of modules on the layout board and for releasing the layout board to facilitate the copying of the arrangement of modules.

8 Claims, 3 Drawing Sheets

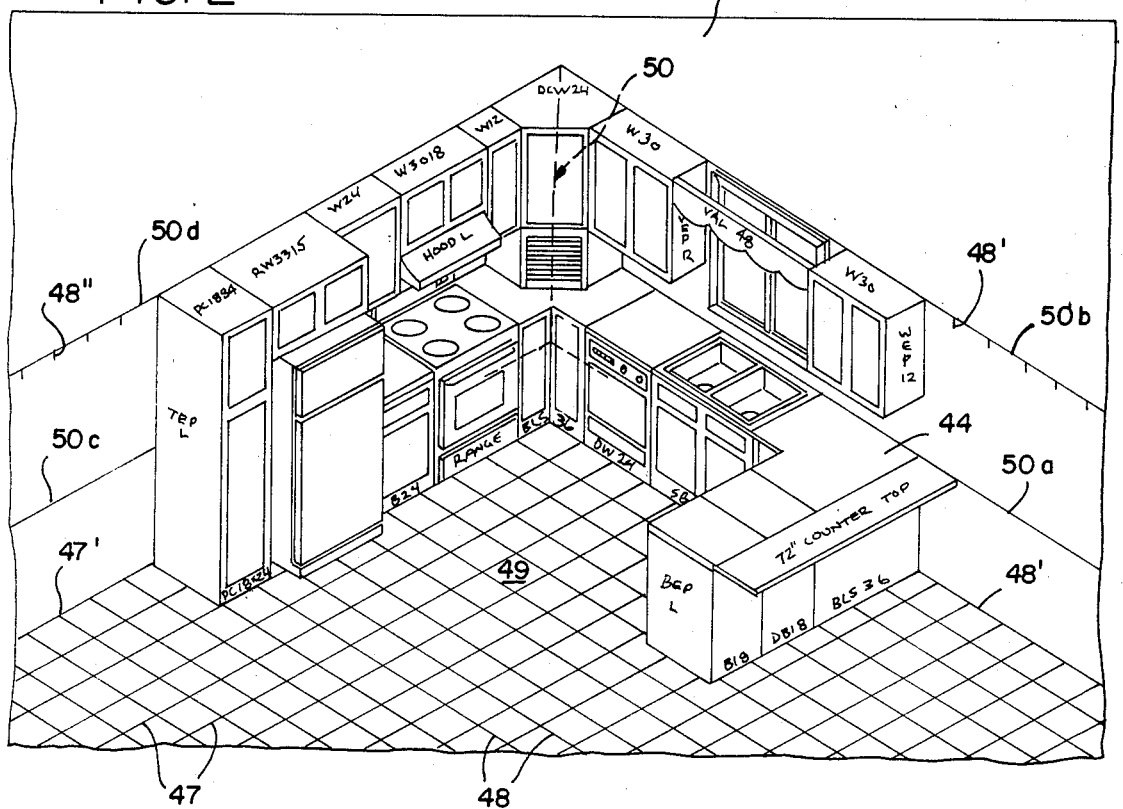
FIG. 2
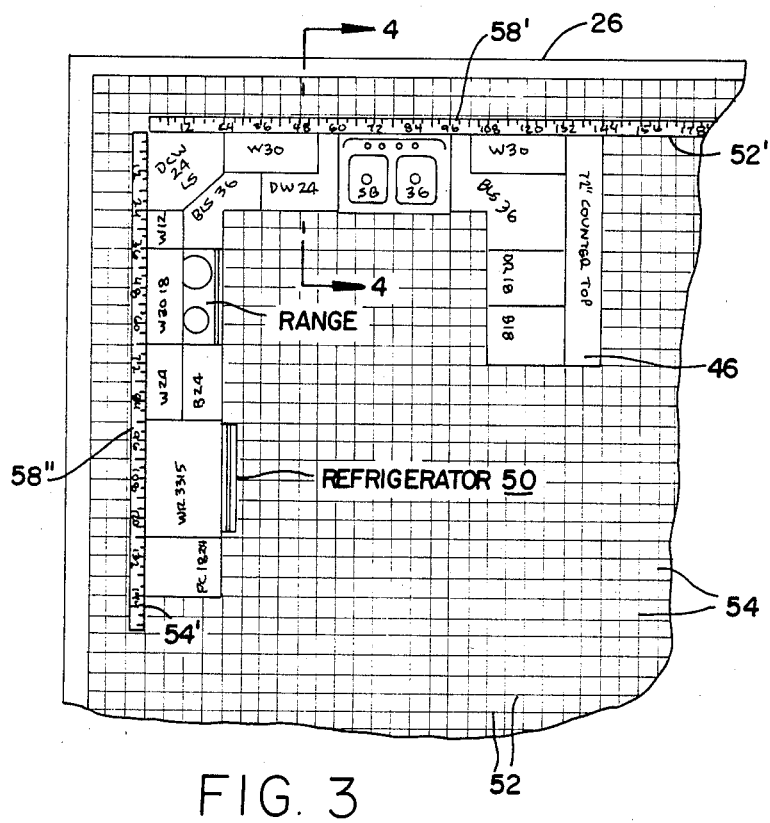
FIG. 3
FIG. 4

MODULAR LAYOUT ASSEMBLY

FIELD OF THE INVENTION

This invention relates to an assembly or kit for aiding sales and, in particular, for permitting efficient layout and display of modular pieces. In one application of this invention, the modular pieces may take the form of furniture, whereby a layout of furniture pieces may be easily assembled and displayed to prospective customers.

BACKGROUND OF THE INVENTION

In both commercial and home settings, it is difficult to visualize how the pieces of furniture or equipment will appear in a given setting or room. The aesthetic appearance of one furniture layout as compared with another are hard to visualize; such difficulty makes the decoration and arrangement of furniture within the home frustrating and time consuming. In a commercial setting, the functional relationship of furniture and office equipment are difficult to ascertain without a module layout of these pieces in their setting.

In the home, visualization of a furniture layout may be obtained by the laborious rearrangement of the present furniture. A greater problem is presented when new pieces of furniture have to be added to a presently decorated room. Alternatively, a draftsman may draw a proposed layout sketch illustrating either a plan or a perspective view of the arrangement of pieces. However, it is difficult to readily rearrange the drawn pieces without completely making a new sketch. As a result, a large number of hours may be spent in providing a number of sketches until that modular layout that is acceptable from a functional or aesthetic point of view is realized.

A more practical solution resides in the use of models that may be readily rearranged upon a layout board. If the placement of a furniture module is not aesthetically appealing or functional, it may be readily moved to a series of locations until the "right" placement is found for that piece of furniture or equipment. To be effective, these modules must be accurate and realistic so that the final layout may simulate, in a manner as closely as possible, the actual appearance of the room. U.S. Pat. No. 2,941,314 of Schwieger discloses a display case having two sections in which are fixedly disposed plates. A grid-like sheet is disposed over each plate and a set of furniture modules may be arranged upon the plates in the desired room arrangement. In particular, the plates may be made of a partial ferrous metal. Each of the furniture modules includes a permanent magnet, whereby its module may be attached to the plate. Each section of the display case is connected to the other by a hinge, whereby the sections may be closed on each other and secured by a catch. Since each plate is affixedly secured to each section, the hinges are designed so that they may be separated to permit the removal of one section along with the plan and models so that it can be easily carried to and compared with different locations of the room to be arranged. The sections when closed and locked by the catch form a carrying case, whereby the models and the plates and planning sheets may be carried about. The disclosed modules do not permit relatively easy copying in that separate permanent magnets are attached to each of the furniture models. In addition, it would be difficult to superimpose one furniture module on another.

U.S. Pat. No. 3,659,353 of D'Agrosa discloses a method of preparing a modular layout, whereby a sheet made of a magnetically attractive material is provided for receiving and supporting a sheet of a magnetically permeable material. Sets of lines are disposed upon the sheet to define a grid, whereby a plurality of modules resembling furniture may be arranged on the grid. The furniture modules are made of a magnetically attractive material that may be disposed upon the surface of the magnetically permeable sheet and held thereon by the magnetic forces as established between the sheet and the furniture modules. The flexible sheet of magnetically attractive material and the sheet of magnetically permeable material are in turn supported by a rigid frame member so that these sheets may be easily transported and moved to a work table, whereby conventional photographic reproduction apparatus may take a negative of a particular arrangement of the modules. A conventional positive print may then be reproduced from this negative. The method described by the D'Agrosa patent '353 involves a rather elaborate photographic procedure, wherein a photographic negative is first taken, next a positive print is reproduced, and only then the positive image is easily reproduced on readily available office reproduction equipment. The use of three distinct elements, namely the tray, the magnetically attractive sheet and the magnetically permeable sheet do not readily lend themselves to easy reproduction on office reproduction equipment.

In contrast to the noted D'Agrosa patent '353 and Schwieger patent '314, U.S. Pat. No. 2,984,020 of Levitas describes for arranging for arranging furniture to provide a perspective view of the furniture modules. The furniture modules of Levitas include strips extending therefrom that permit each furniture module to be held in place by clips attached to the side of a baseboard. It is evident that this manner of securing the furniture modules to a baseboard does not permit the ready rearrangement of the furniture modules, much less the reproduction of these modules by readily available office reproduction equipment.

If it is desired to arrange furniture modules into a perspective view, it is necessary to place one module to overlie an earlier placed module. For example, as shown in FIG. 1 of Levitas patent '020, a cabinet module is first arranged on the perspective layout board and thereafter a desk module is placed so that a portion of the desk module overlays the cabinet module. Levitas suggests that each of the desk and cabinet modules is held by a strip extending to the edge. It has been found that the use of the strips is cumbersome and it would be desired to employ a magnetic device with each furniture module to permit the module to be releasably retained upon the layout board. A review of the above discussed D'Agrosa patent '353 and the Schwieger patent '314 indicates that only plan layouts are disclosed and that their furniture modules are not designed to be layed one-over-the-other as may be required to provide a perspective layout.

SUMMARY OF THE INVENTION

It is therefore an object of this invention to provide an assembly including a layout board for releasably receiving furniture modules to be readily adapted for copying by available office reproduction equipment.

It is a further object of this invention to provide a modular layout assembly that is relatively portable from one location to another to assist sales people, e.g., decorators or furniture sales persons, to make onsite furniture arrangements and to reproduce the arrangement onto a paper copy.

It is a still further object of this invention to provide a modular layout assembly that will permit furniture modules to be of a construction to be magnetically attracted to its layout board and to permit one module to overlay another.

It is a more specific object of this invention to provide a perspective modular layout assembly employing furniture modules designed to be disposed on the perspective layout board and of making the furniture modules of a magnetic structure to ensure that overlaying modules will be magnetically attracted to and adhere to the layout board.

In accordance with these and other objects of this invention, there is provided a modular layout assembly for facilitating the layout of elements within a space. The modular layout assembly comprises a plurality of modules, each configured and dimensionally scaled to represent an element and made of a magnetically attracting material. A layout board for receiving the modules is made of a ferrous metal and presents a substantially planar surface; the planar surface has a grid thereon for assisting the arrangement of selected of the modules on the layout board. A case is provided for carrying the layout board and modules, and comprises first and second sections hinged together to permit the case to be opened and closed. The first section has a pocket for receiving the layout board, and a mechanism for retaining the layout board within the case to facilitate the arrangement of selected of the plurality of modules on the layout board and for releasing the layout board to facilitate the copying of the arrangement of modules.

In one embodiment of this invention, the grid is comprised of first and second sets of grid lines disposed substantially perpendicular with respect to each other, whereby the grid facilitates a plan arrangement of the modules. In a further embodiment of this invention, the grid facilitates a perspective layout of the modules along X, Y and Z axes; the grid is comprised of first and second sets of grid lines respectively disposed parallel to the X and Y axes and intersecting each other at acute angles, and a third set of grid lines disposed parallel to at least one of the X and Y axes and intersecting the Z axis.

BRIEF DESCRIPTION OF THE DRAWINGS

A detailed description of a preferred embodiment of this invention is hereafter made with specific reference being made to the drawings in which:

FIG. 2 is a plan view of the perspective layout board and an arrangement of perspective modules thereon;

FIG. 3 is a partial, plan view of the plan layout board and arrangement of plan modules thereon;

FIG. 4 is a sectioned, side view of the plan module as taken along line 4—4 of FIG. 3;

PREFERRED EMBODIMENT OF THIS INVENTION

Figure 1:
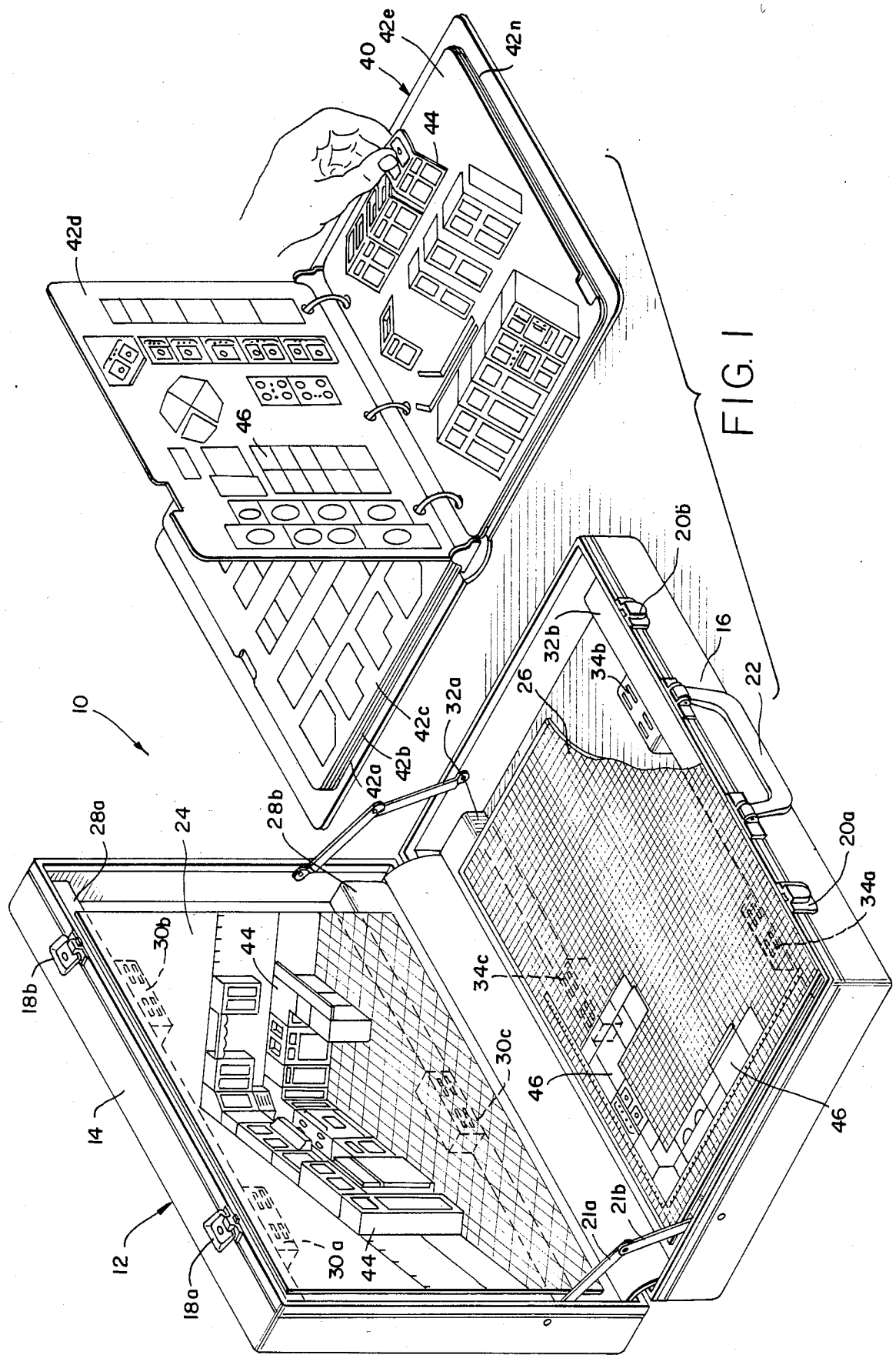
FIG. 1 is a perspective, assembly view of the case for receiving each of the perspective layout board, the plan layout board and the modular storage folder for receiving the perspective and plan modules.

Referring now to the drawings and, in particular to FIG. 1, there is shown a modular layout assembly 10 comprising a case 12 for receiving each of a perspective layout board 24, a plan layout board 26, and a module storage folder 40 for conveniently storing a variety of perspective modules 44 and plan modules 46. As illustrated in FIG. 1, the perspective modules 44 and plan modules 46 are configured as to design and scaled as to dimension to resemble accurately furniture and, in particular, kitchen furniture.

The case 12 comprises a first section 14 as hinged by a plurality of hinges (not shown) to a second section 16. When the first section 14 is closed upon the second section 16, a pair of latches 18a and 18b may be snapped over to engage corresponding of a pair of catches 20a and 20b. Upon closing, the sections 14 and 16 form the case 12 for receiving the boards 24 and 26, and the module storage folder 40. A handle 22 is secured to the case 12, whereby the case 12 may be readily carried from location to location, i.e., to the client's site, whose layout is to be arranged. As shown in FIG. 1, the first section 14 is supported in an upright manner, by a pair of articulated support arms 21a and 21b, and 21a' and 21b'. As illustrated, a first end of each of the arms 21a and 21a' is secured to the first section 14, and a first end of the support arms 21b and 21b' is connected to the second section 16. The other ends of the support arms 21a and 21b and 21a' and 21b' are coupled to each other, whereby upon pivoting the arms 21a and 21b past their dead center point, the first section 12 is retained in an upright position.

Referring now to FIGS. 2 and 3, there is shown respectively the perspective layout board 24 and the plan layout board 26. Each of the layout boards 24 and 26 is made of a ferrous metal such as a bonded zinc coated steel having a thickness of 0.018 inch. Each of the perspective modules 44 and plan modules 46 are magnetic elements and are attracted to their respective boards 24 and 26 with sufficient force that they are releasably affixed thereto to permit the boards 24 and 26 to be moved freely about without danger that the modules 44 and 46 will fall off or will change their positions on the boards. As shown in FIG. 2, the perspective layout board 24 includes a floor line 48' disposed along the X axis of a perspective, three-dimensional representation, a floor line 47' disposed along the Y axis, and a corner line 50 disposed along the Z axis. A first set of grid lines 47 is disposed substantially parallel to the floor line 47', whereas a second set of grid lines is disposed parallel to the floor line 48' and intersecting the reference lines 47 of the second set to form a grid 49. A pair of grid lines 50a and b is disposed parallel to the floor line 48'; the lower-most grid line 50a is spaced a first distance from the floor line 48' equal to the height of those modules 44 representing kitchen furniture resting on the floor of the perspective layout board 24. The upper-most grid line 50b is spaced a second, greater distance from the floor line 48' corresponding to the ceiling of the represented room. In a similar fashion, grid lines 50c and d are disposed substantially parallel to the floor line 47' and the distances between the floor line 47' to the grid lines 50c and d are similarly determined. The grid lines 50a, b, c and d provide means for measuring distances along the Z axis 50, whereas grid lines 47 and 48 respectively provide means for measuring distances along the Y and X axes, whereby the perspective modules 44 may be positionally spaced within a room as represented by the perspective display shown in FIG. 2. A set of equally spaced marks 48' are disposed along the top-most grid line 50b corresponding to the spacing between the grid lines 47 and, similarly, a set of markings 48" are disposed along the top-most grid line 5d and are spaced equally apart according to the spacing between the grid lines 48. The above described grid may be made of enamel paints baked on the perspective layout board 24.

In FIG. 3, there is shown the two-dimensional, plan layout board 26 with a floor line 52' disposed along the X axis and a floor line 54' disposed along the Y axis. Each grid line 52 of a first set is disposed parallel with respect to the floor line 52' and is equally spaced from an adjacent grid line 52. Each grid line 54 of a second set is disposed substantially parallel with respect to the floor line 54' and is substantially equally spaced from an adjacent grid line 54. As illustrated in FIG. 3, the first and second sets of grid lines 52 and 54 intersect with each other to define a plan grid 56 for facilitating the arrangement of the plan modules 46. A pair of reference scales 58' and 58" is respectively placed along the base lines 52' and 54' to provide a representation of the spacings between the grid lines and therefore the spacing of the plan modules 46 with respect to each other. In the illustrative embodiment of FIG. 3, the scales 58' and 58" provide measurement markings in inches and the modules 46 represent accurately, in terms of configuration and scaling, kitchen furniture, appliances and cabinetry. It will be appreciated that other units of measurements, e.g., metric, and other styles of modules may be used in accordance with the teachings of this invention. For example, the modules 44 and 46 may be configured to represent office or industrial furniture and equipment, bedroom, living room and dining room furniture.

Each of the perspective modules 44 and the plan modules 46 is made of a magnetic material, whereby they are attracted to the ferrous material of which the boards 24 and 26 are made. In an illustrative embodiment of this invention, the perspective modules 44 and the plan modules 46 are made of a compliant, flexible material such as rubber in which barium ferrite is suspended. Such a rubber is manufactured by the BF Goodrich Company under their trademark, KOROSEAL. The magnetic qualities of such a material permit the placement of the modules 44 and 46 respectively onto their boards 26 and 28. Further, the modules 44 and 46 are of a relatively thin thickness, e.g., 20 mils., that permits one module to be layed on top of the other, as illustrated in FIG. 4. It is seen in each of FIGS. 2 and 3, that either a plan or perspective representation may require that one module will be layed over another. For example, as shown in FIG. 2, the cabinets RW3315 and PC1824 are layed over a portion of the cabinet W24 and the refrigerator.

As shown in FIG. 3, the plan module 46 corresponding to the base cabinet B24 is layed upon its layout board 26 and, thereafter, the module 46 representing the wall cabinet W24 is layed over the first layed plan module 46. In accordance with an aspect of this invention, each of the modules 44 and 46 is made of a magnetic material and the arrangement of magnetic poles within each of the modules 44 and 46 is arranged so that the module 46 representing the cabinet B24 does not repel the module 46 representing the cabinet W24 and, at the same time, each module 46 is attracted to the layout board 26.

Figure 6:
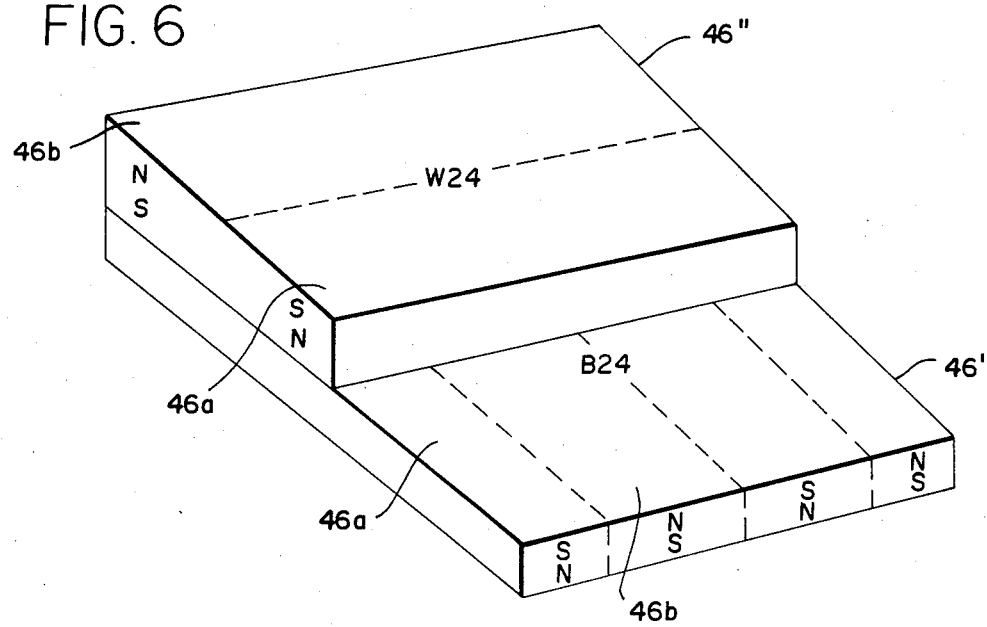
FIG. 6 is a perspective view illustrating the magnetic pole arrangement of one module overlaying another.

The arrangement of the magnetic poles within each of the modules will now be described with respect to FIG. 6. The plan module 46' is particularly adapted to be the first furniture module disposed upon its layout board 26, whereas the plan module 46" is adapted, as will be explained, to be overlayed upon the module 46'. The module 46' is made of the above described material and a permanent magnetic pole arrangement is disposed therein, as illustrated by the alternate stripes 46a and 46b. The first stripe 46a runs longitudinally along the length of the module 46' and has a south pole is induced on its upper surface, whereas a north pole is induced on its lower surface. By contrast, the stripe 46b has a north pole extending longitudinally along the length of its upper surface, whereas a south pole extends longitudinally along the length of its lower surface. This arrangement provides for magnetic fields of approximate equal strength on each of the lower and upper surfaces of the modules 46' and 46". Thus, the module 46' exerts a magnetically attracting field, whereby it is attracted and held to the layout board 26. The upper module 46" is provided with a similar set of stripes 46a and 46b. In particular, the stripe 46a has a longitudinally disposed south pole on its upper surface and a north pole disposed along its lower surface. The stripe 46b, in contrast, has a north pole extending longitudinally along its upper surface and a south pole along its lower surface.

As shown in FIGS. 2 and 3, each module 46' and 46" may be imprinted with indicia indicative of a particular piece of furniture, such indicia giving a preferential orientation as to the manner in which it may be disposed upon its layout board 26. Thus, when the module 46" is placed upon the lower module 46', its stripes 46a and 46b will be disposed substantially perpendicular to the extent of the stripes 46a and 46b of the lower module 46'. It has been found that such an orientation will permit the upper module 46" to be attracted to the lower module 46' and will prevent a south pole of one module from being fully aligned with a south pole of a lower module, whereby the modules would be forced apart.

In an illustrative embodiment of this invention, the lower and upper modules 46' and 46" are made of the above described material to a thickness of 0.020 inches and is laminated with a flexible, thin layer of PVC, upon which designs, as shown in FIGS. 2 and 3, may be printed with suitable inks. The center-to-center spacing between the stripes 46a and 46b, i.e., the spacing between the poles, is illustratively set in the order of ⅛ inch. It is further contemplated that the upper module 46''' may also be disposed over the lower module 46' such that a north pole of the upper module 46" is immediately opposed by a south pole of the lower module 46'. Further, it is desired to maintain the thickness of the modules 46' and 46" relatively small, as suggested above, in order that the magnetic field as created by the poles of the upper module 46" may pass through the thickness of the lower module 46' to attract the layout board 26.

As shown in FIG. 1, each of the perspective layout board 24 and the plan layout board 26 is retained within the case 12 by releasable retaining mechanisms 30 and 34. For example, a set of three releasable retaining mechanisms is disposed within the first section 14 of the case 12. Each mechanism includes at least one magnetic element for attracting and retaining the perspective layout board 24 within the first section 14. In particular, a pair of mounting members 28a and 28b is disposed respectively at the top and bottom of the first section 14 to provide a spacing between the board 24 and the section 14 to receive various planning materials as may be portably carried by the case 12. The releasable retaining mechanisms 30a and 30b are disposed adjacent to the top-most mounting member 28, whereas the retaining mechanism 30c is disposed adjacent the bottom-most mounting member 28. When so retained within the section 14, a layout planner may readily apply the perspective modules 44 to the perspective layout board 24. When the section 14 is disposed to its open, upright position, the case 12 provides a mechanism for readily displaying the perspective layout board 24 and the arrangement of perspective modules 44 thereon. Similarly, the plan layout board 26 is mounted within the second section 16 by a plurality of the releasable retaining mechanisms 34a, b and c. Releasable retaining mechanisms 34a and b are mounted adjacent a bottom-most mounting member 32b, whereas a third releasable retaining mechanism 34c is disposed adjacent a top-most mounting member 32a. In this fashion, a space is formed between the retained board 26 and the second section 16. Further, when the plan layout board 26 is held by the releasable retaining mechanisms 34, the case 12 provides a convenient work station, whereat the board 26 is mounted for ready placement of the plan modules 46 and for display of the arranged modules 46 upon the plan layout board 26.

As shown in FIG. 1, the plan modules 46 and the perspective modules 44 are stored in the module storage folder 40. The module storage folder 40 includes a plurality of pages 42a, b, c-n, each made of a ferrous material similar to that of which the perspective and plan layout boards 24 and 26 are made. In an illustrative embodiment of this invention, the module storage folder 40 comprises a three-ring notebook with each page 42 being punched so as to be retained within the folder 40. Each page 42 may, in one illustrative embodiment of this invention, be indexed to receive a particular type of module 44 or 46 to assist in the ready selection of a module for placement onto a corresponding one of the boards 24 and 26. It is understood that the module storage folder 40 may be inserted within the case 12 between the boards 24 and 26, whereby it may be readily and portably carried to the planning site.

In an illustrative embodiment of this invention, a plan layout of the desired arrangement is first made, before completing the perspective layout. Illustratively, as shown in FIG. 3, the first module 46 to be layed is that module 46 that fits in the corner defined by the intersection of the base lines 52' and 54' extending along the Y and X axes. For example, a base lazy susan (BLS36) is layed in the corner before in turn positioning the dishwasher (DW24), the sink base (SB36), a second base lazy susan (BLS36), a consecutive pair of bases (DB18) and (B18), and a countertop. After the bottom-most modules have been layed along the floor line 52', those modules representing furniture or cabinetry disposed above the floor are overlayed upon the top of the previously layed modules 46. For example, a diagonal corner wall unit DCW24LS is layed in the corner, followed by the positioning of a wall cabinet (W30). Thereafter, the modules 46 corresponding to the range, a base unit (B24) and a refrigerator are disposed along the floor line 54', before a sequence of wall cabinets (W12, W3018, W24, RW3315), and finally a pantry cabinet (PC1824) are overlayed.

After the plan representation has been completed as shown in FIG. 3, a perspective view is formed as shown in FIG. 2. In a similar fashion, the perspective modules 44 are layed with that module fitting at the intersection of base lines 48', 47' and 50 being layed first, followed by a sequence of perspective modules 44 lying along the base 48' Thereafter, the modules are layed along the reference line 50" with the diagonal corner wall cabinet (DCW24) being layed first in the corner defined by the intersection of the lines 50" and 50''', followed in order by the application of the wall cabinets (W30), (WEP) the window, the wall cabinet (W30) (WEP) and the valence (VAL48). Thereafter, the units aligned along the floor line 50''' are arranged with the hood unit (HOOD L) being added last.

Figure 5:
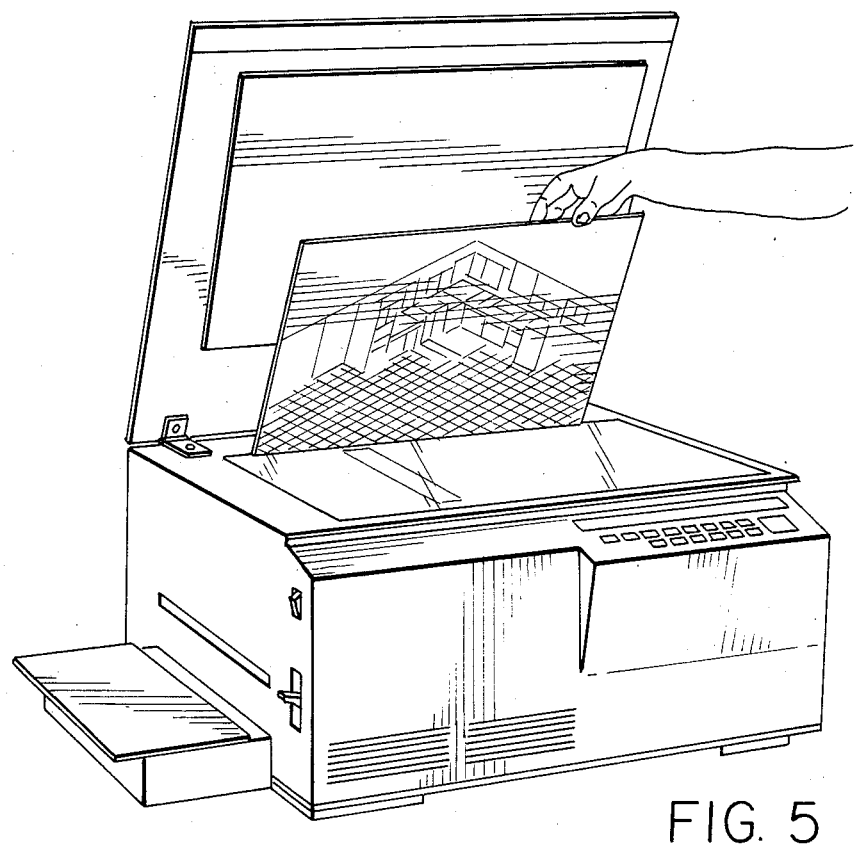
FIG. 5 is a perspective view illustrating the manner in which one of the layout boards may be reproduced by readily available photocopying equipment.

Each of the plan modules 46 and the perspective modules 44 are made of a relatively thin material that permits one module to be disposed over the other and yet still retained to its layout board. When the modules 44 or 46 have been placed respectively upon their perspective layout board 24 or plan layout board 26, the modules are securely retained thereon. Thus, each of the perspective and plan layout boards 24 and 26 may be released respectively from their mechanisms 30 and 34, and removed from its case 12 to permit copying of the resulting layout. In particular, the modules are retained to their layout board such that they may be readily carried to office reproduction equipment 60, as shown in FIG. 5. In the example shown in FIG. 5, the perspective layout board 24 is turned upside down so that a copy of the assembled arrangement may be provided by the equipment 60. It is understood that the particular type of equipment 60 is not significant to the invention, rather that the layout board 24 and 26 may be carried to and readily placed upon the copying surface of the machine 60 is significant. In this regard, the thinness and the magnetic properties of each of the perspective and plan modules 44 and 46 permits copies to be obtained in this manner. Additional features can be added to the copies by marking the modules 44 and 46 and their respective layout board 24 and 26 with an ordinary non-permanent, felt tip pen. Further, additional door-style, hardware and special effects can be added by marking directly on the copy provided by the equipment 60.

Thus, there has been shown and described a modular layout assembly that permits a designer to arrange modules representing equipment, furniture, or the like into the desired layout. Ideas can be quickly transformed into the desired layout in that each of the modules may be readily shifted from one position to the next to permit the visualization of a particular placement of that module. If one arrangement is not satisfactory, that arrangement of modules may be readily reassembled until the desired, acceptable arrangement is achieved. After the desired arrangement has been achieved, the layout board with the modules fixedly secured thereto is taken to office reproduction equipment, where any number of copies of the module arrangement may be easily made. Additional design features may be marked in pencil or ink directly onto the reproduced copy or onto the modules and boards, themselves.

It should be understood that the foregoing description relates to the preferred embodiment of this invention and that modifications may be made therein without departing from teachings of this invention as set forth in the appended claims.

We claim:

1. A modular layout assembly for facilitating the layout of elements within a space, said assembly comprising:
   (a) a plurality of modules configured and dimensionally scaled to represent the elements, each of said modules made of a magnetically attracting material;
   (b) a layout board made of a ferrous metal and presenting a substantially planar surface, said planar surface having a grid thereon for assisting the placement of selected of said modules on said layout board; and
   (c) a case comprising first and second sections, means for hinging together said first and second sections to permit said case to be opened and closed, said first section having a pocket for receiving said layout board, and means for retaining said layout board within said case to facilitate the arrangement of selected of said plurality of modules on said layout board and for readily releasing said layout board to facilitate the copying of said arrangement of modules.

2. The modular layout assembly as claimed in claim 1, wherein said grid is comprised of first and second sets of grid lines disposed substantially perpendicular with respect to each other, whereby said grid facilitates a plan arrangement of said modules.

3. The modular layout assembly as claimed in claim 1, wherein said grid facilitates a perspective layout of said modules along X, Y and Z axes, said grid comprised of first and second sets of grid lines respectively disposed parallel to said X and Y axes and intersecting each other at acute angles, and a third set of grid lines disposed parallel to at least one of said X and Y axes and intersecting said Z axis.

4. The modular layout assembly as claimed in claim 1, wherein each of said plurality of modules is made of a flexible material to permit one of said plurality of modules to be placed upon another of said modules, while clinging to said layout board.

5. The modular layout assembly as claimed in claim 4, wherein each of said plurality of modules is thin, thereby preventing shadows from being created upon the reproduced copy of said arrangement of modules.

6. The modular layout assembly as claimed in claim 1, wherein there is included a second layout board similar to said first mentioned layout board, and said second section having a pocket for receiving said second layout board and means for retaining said second layout board within said second section.

7. The modular layout assembly as claimed in claim 1, wherein said releasable retaining means comprises a magnetic element for magnetically attracting and releasably retaining said layout board within said first section.

8. A modular layout assembly facilitating the arrangement of elements within a space, said assembly comprising:
   (a) first and second layout modules configured and dimensionally scaled to represent the elements, each of said first and second modules made of a magnetic material;
   (b) a layout board made of a ferrous metal and presenting a substantially planar, first mounting surface, said first mounting surface having a grid thereon for assisting placement of selected of said first and second modules on said layout board; and
   (c) each of said first and second layout modules being designed to have predetermined normal orientations with respect to said grid, said first layout module having a first attracting surface adapted to be disposed on said first mounting surface, a second mounting surface disposed oppositely of said attracting surface and having indicia thereon indicative of its element and a first plurality of parallel alternate north and south magnetic poles extending along said second mounting surface, said second layout module having a second attracting surface adapted to overlie at least in part said second mounting surface and an opposite, exposed surface having indicia thereon indicative of its corresponding element, said second attracting surface having a second plurality of parallel alternate north and south magnetic poles extending along said second attracting surface, said second plurality of north and south magnetic poles being oriented substantially perpendicular to said first plurality of north and south magnetic poles when said first and second layout modules are disposed in their respective normal orientations with respect to said grid, whereby both of said first and second layout modules are attracted to said layout module to said first layout module may be continuously adjusted to achieve the desired arrangement of said first and second modules.

* * * * *